United States Patent
Han et al.

(10) Patent No.: US 9,823,676 B2
(45) Date of Patent: Nov. 21, 2017

(54) METHOD AND ELECTRONIC DEVICE FOR CONTROLLING CURRENT

(71) Applicant: Samsung Electronics Co., Ltd., Gyeonggi-do (KR)

(72) Inventors: Yun Hui Han, Gyeonggi-do (KR); Chul Woo Park, Gyeonggi-do (KR); Kisun Lee, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 275 days.

(21) Appl. No.: 14/634,545

(22) Filed: Feb. 27, 2015

(65) Prior Publication Data
US 2015/0248135 A1  Sep. 3, 2015

(30) Foreign Application Priority Data

Feb. 28, 2014  (KR) .................. 10-2014-0024411

(51) Int. Cl.
*H02J 3/14* (2006.01)
*G05F 1/46* (2006.01)

(52) U.S. Cl.
CPC .............. *G05F 1/462* (2013.01); *G05F 1/463* (2013.01); *Y10T 307/406* (2015.04)

(58) Field of Classification Search
CPC .................................. G05F 1/462; G05F 1/463
USPC ............................................................ 307/31
See application file for complete search history.

(56) References Cited

U.S. PATENT DOCUMENTS

| | | | |
|---|---|---|---|
| 7,362,080 B2 | 4/2008 | Sohn et al. | |
| 8,963,515 B2 | 2/2015 | Sun | |
| 9,472,510 B2 | 10/2016 | Watanabe et al. | |
| 2006/0043945 A1 | 3/2006 | Sohn et al. | |
| 2011/0010567 A1* | 1/2011 | Schmitz | G06F 1/3203 713/300 |
| 2011/0115454 A1 | 5/2011 | Benedict et al. | |
| 2012/0062197 A1 | 3/2012 | Luders et al. | |
| 2013/0185581 A1* | 7/2013 | Michalak | G06F 9/5094 713/340 |
| 2013/0259092 A1* | 10/2013 | Im | G01K 7/34 374/184 |
| 2013/0278284 A1 | 10/2013 | Watanabe et al. | |
| 2014/0016358 A1 | 1/2014 | Li et al. | |
| 2014/0016381 A1 | 1/2014 | Sun | |
| 2014/0016384 A1 | 1/2014 | Sun | |
| 2014/0068314 A1* | 3/2014 | Kim | G06F 1/3212 713/340 |

FOREIGN PATENT DOCUMENTS

| | | |
|---|---|---|
| CN | 103376815 A | 10/2013 |
| KR | 20060019164 A | 3/2006 |
| KR | 20130026980 A | 3/2013 |

OTHER PUBLICATIONS

International Search Report dated May 28, 2015 in connection with International Application No. PCT/KR2015/001792; 3 pages.

(Continued)

*Primary Examiner* — Lincoln Donovan
*Assistant Examiner* — Metasebia Retebo

(57) ABSTRACT

A method of controlling current includes receiving a current value detected by at least one regulator supplying a unit-specific voltage to each unit of an electronic device. The method also includes controlling a current flowing through the each unit on the basis of the current value.

24 Claims, 10 Drawing Sheets

(56) References Cited

OTHER PUBLICATIONS

Communication from a foreign patent office in a counterpart application, "First Office Action," Chinese Application No. 201580010455.4, State Intellectual Property Office of People's Republic of China, dated Jul. 10, 2017, 19 pages.

* cited by examiner

METHOD AND ELECTRONIC DEVICE FOR CONTROLLING CURRENT

CROSS-REFERENCE TO RELATED APPLICATION(S) AND CLAIM OF PRIORITY

The present application is related to and claims priority of Korean patent application No. 10-2014-0024411 filed Feb. 28, 2014, the disclosure of which is hereby incorporated in its entirety by reference, is claimed.

TECHNICAL FIELD

The present disclosure relates to a method and electronic device for controlling current.

BACKGROUND

A power supply device supplies a unit specific operating voltage to each unit of an electronic device. When a current exceeding the output range of such a power supply device occurs, the power supply device stops supplying power to prevent the damage of an electronic device.

SUMMARY

To address the above-discussed deficiencies, it is a primary object to provide a method and electronic device for controlling current.

Various embodiments of the present disclosure are related to providing a computer readable recording medium having a program recorded thereon.

According to an embodiment of the present disclosure, a method of controlling current includes: receiving a current value detected by at least one regulator supplying a specific unit voltage to each unit of an electronic device; and controlling a current flowing through the each unit on the basis of the current value.

According to another embodiment of the present disclosure, a method of controlling current includes: receiving an input current value detected at an input terminal of a power management module managing a unit-specific voltage, which is connected to a battery of an electronic device; calculating an expected available time of the electronic device on the basis of a remaining power of the battery when the input current value is maintained; and when the available time is less than a specific time, sending a warning.

According to another embodiment of the present disclosure, an electronic device includes: a current sensing unit configured to detect a current outputted from at least one regulator included in a power management module supplying a unit-specific voltage to each unit of an electronic device; and a current control unit configured to control a current flowing through the each unit on the basis of a current value received from the current sensing unit.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
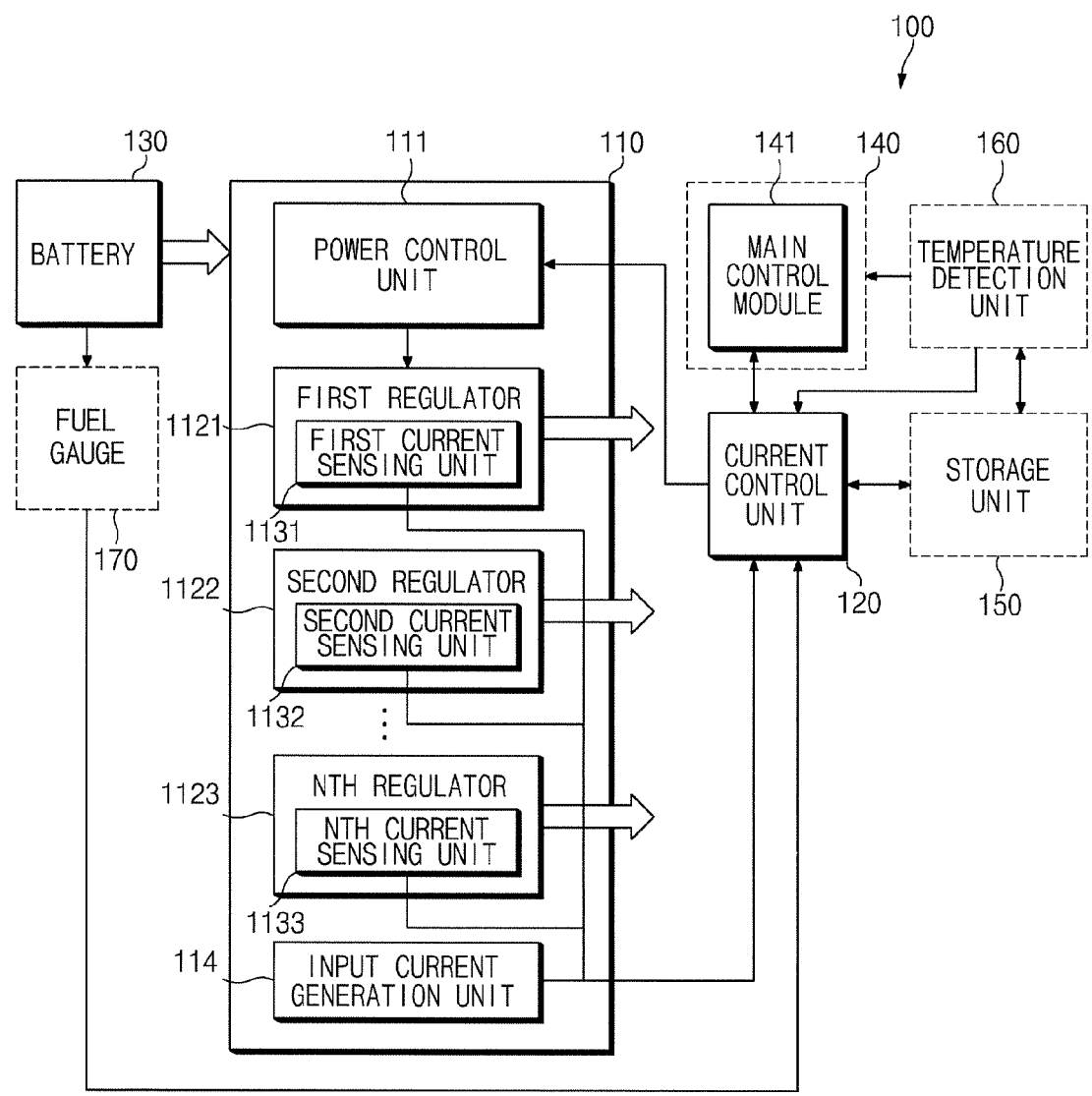
FIG. 1 illustrates an electronic device according to various embodiments of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Hereinafter, various embodiments of the present disclosure are disclosed with reference to the accompanying drawings. Various modifications are possible in various embodiments of the present disclosure and specific embodiments are illustrated in drawings and related detailed descriptions are listed. However, this does not limit various embodiments of the present disclosure to a specific embodiment and it should be understood that the present disclosure covers all the modifications, equivalents, and/or replacements of this disclosure provided they come within the scope of the appended claims and their equivalents. With respect to the descriptions of the drawings, like reference numerals refer to like elements.

The term "include," "comprise," and "have", or "may include," or "may comprise" and "may have" used herein indicates disclosed functions, operations, or existence of elements but does not exclude other functions, operations or elements. Additionally, in various embodiments of the present disclosure, the term "include," "comprise," "including," or "comprising," specifies a property, a region, a fixed number, a step, a process, an element and/or a component but does not exclude other properties, regions, fixed numbers, steps, processes, elements and/or components.

In various embodiments of the present disclosure, the expression "or" used herein includes any or all combinations of the words connected by the term "or". For instance, the expression "A or B" may indicate include A, B, or both A and B.

The terms such as "1st", "2nd", "first", "second", and the like used herein may refer to modifying various different elements of various embodiments, but do not limit the elements. For instance, such terms do not limit the order and/or priority of the elements. Furthermore, such terms may be used to distinguish one element from another element. For instance, both "a first user device" and "a second user device" indicate a user device but indicate different user devices from each other. For example, a first component may be referred to as a second component and vice versa without departing from the scope of the present disclosure.

In this disclosure below, when one part (or element, device, etc.) is referred to as being "connected" to another part (or element, device, etc.), it should be understood that the former can be "directly connected" to the latter, or "connected" to the latter via an intervening part (or element, device, etc.). In contrast, when an element is referred to as being "directly connected" or "directly coupled" to another element, there are no intervening elements present.

In various embodiments of the present disclosure, terms used in this specification are used to describe specific embodiments, and are not intended to limit the scope of the present disclosure. The terms of a singular form may include plural forms unless they have a clearly different meaning in the context.

Otherwise indicated herein, all the terms used herein, which include technical or scientific terms, may have the same meaning that is generally understood by a person skilled in the art. In general, the terms defined in the dictionary should be considered to have the same meaning as the contextual meaning of the related art, and, unless clearly defined herein, should not be understood abnormally or as having an excessively formal meaning.

Additionally, an electronic device according to various embodiments of the present disclosure may be a device with a communication function. For instance, electronic devices may include at least one of smartphones, tablet personal computers (PCs), mobile phones, video phones, electronic book (e-book) readers, desktop personal computers (PCs), laptop personal computers (PCs), netbook computers, personal digital assistants (PDAs), portable multimedia player (PMPs), MP3 players, mobile medical devices, cameras, and wearable devices (e.g., head-mounted-devices (HMDs) such as electronic glasses, electronic apparel, electronic bracelets, electronic necklaces, electronic appcessories, electronic tattoos, and smart watches).

According to some embodiments, an electronic device may be smart home appliances having a communication function. The smart home appliances may include at least one of, for example, televisions, digital video disk (DVD) players, audios, refrigerators, air conditioners, cleaners, ovens, microwave ovens, washing machines, air cleaners, set-top boxes, TV boxes (e.g., SAMSUNG HOMESYNC, APPLE TV or GOOGLE TV), game consoles, electronic dictionaries, electronic keys, camcorders, and electronic picture frames.

According to some embodiments, an electronic device may include at least one of various medical devices (for example, magnetic resonance angiography (MRA) devices, magnetic resonance imaging (MRI) devices, computed tomography (CT) devices, medical imaging devices, ultrasonic devices, and so forth), navigation devices, global positioning system (GPS) receivers, event data recorders (EDRs), flight data recorders (FDRs), vehicle infotainment devices, marine electronic equipment (for example, marine navigation systems, gyro compasses, and so forth), avionics, security equipment, vehicle head modules, industrial or household robots, financial institutions' automatic teller's machines (ATMs), and stores' point of sales (POS).

According to some embodiments, an electronic device may include at least one of furniture, buildings or structures having a communication function, electronic boards, electronic signature receiving devices, projectors, and various measuring instruments (for example, water, electricity, gas, or radio signal measuring instruments). An electronic device according to various embodiments of the present disclosure may be one of the above-mentioned various devices or a combination thereof. Additionally, an electronic device according to various embodiments of the present disclosure may be a flexible device. Furthermore, it is apparent to those skilled in the art that an electronic device according to various embodiments of the present disclosure is not limited to the above-mentioned devices.

Hereinafter, an electronic device according to various embodiments will be described in more detail with reference to the accompanying drawings. The term "user" in various embodiments may refer to a person using an electronic device or a device using an electronic device (for example, an artificial intelligent electronic device).

FIG. 1 illustrates an electronic device according to various embodiments of the present disclosure.

An electronic device 100 may include a power management module 110, a current control unit 120, a battery 130, and an Application Processor (AP) 140. The power management module 110 may include a power control unit 111, at least one regulator 112 (for example, a first regulator 1121, a second regulator 1122, . . . , an Nth regulator 1123), at least one current sensing unit 113 (for example, a first current sensing unit 1131, a second current sensing unit 1132, . . . , and an Nth current sensing unit 1133), and input current sensing unit 114. According to various embodiments, the electronic device 100 may further includes at least one of a storage unit 150, a temperature detection unit 160, and a fuel gauge 170.

In order to not to obscure the features of this embodiment in this specification, only components relating to this embodiment will be described. Accordingly, it is apparent to those skilled in the art that other general components in addition to the components shown in FIG. 1 are further included.

The electronic device 100 according to this embodiment may control a unit-specific current (or a specific current for each unit) on the basis of a current value outputted from at least one regulator 112 of the power management module 110.

The power management module 110 converts a voltage supplied from the battery 130 and supplies the converted voltage to each unit of the electronic device 100. Since an operating voltage of each unit of the electronic device 100 varies, the power management module 110 outputs a unit-specific voltage (or a specific voltage for each unit).

The power management module 110 may include at least one regulator 112. For example, the power management module 110 may include N regulators. A voltage outputted from each regulator 112 may be supplied to each unit of the electronic device 100. For example, the power management module 110 may supply voltage to the AP 140, a graphic processing unit (GPU), the storage unit 150, and a display module according to an operating voltage of each unit.

The power control unit 111 controls the first regulator 1121 to the Nth regulator 1123. The power control unit 111 may control operations of the first regulator 1121 to the Nth regulator 1123 according to a signal from the AP 140 or the current control unit 120.

For example, when the current control unit 120 determines that there is an abnormality in a current value of a display module, which is detected during the booting of the electronic device 100, the current control unit 120 may transmit a signal to the power management module 110. In response to the signal, the power control unit 111 of the power management module 110 may cut off voltage supply to a display module.

For another example, the power control unit 111 may adjust a voltage outputted from the regulator 112 according to a signal from the AP 140 or the current control unit 120.

Alternatively, the power control unit 111 may change a power mode of the first regulator 1121 to the Nth regulator 1123 according to a signal from the AP 140 or the current control unit 120. For example, when the regulator 112 has two power modes such as a low power mode (LPM) and a normal power mode (NPM), the regulator 112 may change the LPM into the NPM according to a signal from the AP 140 or the current control unit 120.

The regulator 112 outputs a voltage corresponding to an operating voltage of a unit connected to the regulator 112 by converting an inputted voltage. According to various embodiments, the regulator 112 may include a buck converter, a low dropout regulator (LDO), a boost converter, a DC-DC regulator, and a switching regulator. The regulator 112 is not limited to the type of the listed regulators and may include all ICs, devices, components, and blocks, all of which output a desired voltage by adjusting an inputted voltage.

The current sensing unit 113 detects a current outputted from at least one regulator 112 included in the power management module 110. According to various embodiments, the current sensing unit 113 may be implemented with a current sensor and a current sensing circuit. The current sensing unit 113 is not limited to those listed above and may include all ICs, devices, components, and blocks, all of which are capable of measuring current.

The input current sensing unit 114 detects an input current at an input stage of the power management module 110 connected to the battery 130.

A current detected by the input current sensing unit 114 and the first current sensing unit 1131 to the Nth current sensing unit 1133 may be transmitted to the current control unit 120. According to an embodiment, the power management module 110 may convert the current, which is detected by the current sensing unit 113, into a current value by using an analog to digital converter (ADC, not shown).

The power management module 110 may deliver the current value obtained by the current sensing unit 113 to the current control unit 120 by using a serial interface such as I2C. The delivery of the current value to the current control unit 120 is not limited to a serial interface and includes all devices and methods for delivering the current value to the current control unit 120.

The current control unit 120 may control a current flowing through each unit on the basis of the current value received from the power management module 110. In this embodiment, although the current control unit 120 is separated from the AP 140, the current control unit 120 may be included in the AP 140 according to various embodiments. The present disclosure is not limited thereto and the current control unit 120 may be included in another processor.

The current control unit 120 may control a current flowing through each unit through the AP 140 or the power management module 110 according to the received current value. For example, the current control unit 120 may adjust a clock of a unit that is to control current through the AP 140. Alternatively, the current control unit 120 may adjust an operation of the regulator 112 supplying voltage to a unit that is to control current through the current management module 110.

The current control unit 120 may perform data processing such as performing calculation, comparison, accumulation, counting, and algorithm on a current value received from the current sensing unit 113. The current control unit 120 may control current by using a value processed by the data processing.

For example, the current control unit 120 may obtain the average value, maximum value, or minimum value of a current value obtained for a specific time. The current control unit 120 may continuously update an obtained current value and the maximum value, minimum value or average value of current according to a current value received from the current sensing unit 113. The current control unit 120 may count the number of times in which a current value obtained for a specific time exceeds a specific threshold value. Alternatively, the current control unit 120 may compare the current value received from the power management module 110 or a processed value with a current value, a database (DB), or a look-up table stored in the storage unit 150. The current control unit 120 may continuously update a current value, a database, or a look-up table stored in the storage unit 150 on the basis of a current value received from the current sensing unit 1130. According to an embodiment, the current control unit 120 may compare the received current value with a reference current value of a corresponding unit. The reference current value is a current value that is the reference of a current control. The reference current value may be a theoretically or experimentally determined value for preventing temperature heat or unit damage. When a current exceeds the reference current value for a specific time, the current control unit 120 may adjust a clock of the unit. For example, by adjusting a frequency of the unit clock to be lower, a current flowing through the unit is controlled not to be higher.

According to another embodiment, the current control unit 120 may compare the current value received at the booting or restarting of the electronic device 100 with a reference current value at the booting or restarting of a corresponding unit. The reference current value according to this embodiment is a current value that is the reference of an abnormal operation determination of a unit at the booting or restarting. The reference current value may be a theoretically or experimentally determined value. On the basis of the comparison result, the current control unit 120 determines whether the unit is normal and according to the normality, may control a current flowing through the unit. For example, the current control unit 120 may limit a function of the unit through the AP 140 or the power management module 110 and may control not to operate the unit.

According to another embodiment, the current control unit 120 may compare the received current value with a look-up table of a corresponding unit and may obtain a voltage value matching the current value. On the basis of the obtained voltage value, the current control unit 120 may adjust a voltage of the unit through the power management module 110. For example, as the current value is lower, the current control unit 120 may adjust a voltage of the unit to be lower on the basis of a voltage value obtained from the look-up table.

According to another embodiment, the current control unit 120 may compare the received current value with a reference current value of a corresponding unit. A reference voltage value according to this embodiment is a current value that is the reference for changing a power mode. The reference current value may be a theoretically or experimentally determined value. For example, the current control unit 120 may switch a power mode of the regulator 112 into the LPM when the current value becomes less than a reference current value.

According to another embodiment, the current control unit 120 may calculate a temperature prediction value representing a temperature change of a corresponding unit by using the received current value and a temperature detected by the temperature detection unit 160. The current control unit 120 may control the current on the basis of the temperature prediction value.

According to another embodiment, the current control unit 120 may calculate an available time of an electronic device on the basis of the received input current value and the remaining battery power. The available time represents an expected time during which the electronic device is available when the input current value is maintained. The current control unit 120 may autonomously control a current of the electronic device 100 or may alert a user to control a current of the electronic device 100 on the basis of the available time.

According to another embodiment, the current control unit 120 may calculate the maximum value, the minimum value, an average value or the number of times exceeding a threshold value of a current value obtained during a time predetermined by the electronic device 100 or during predetermined event occurrence and may transmit the calculated value to the AP or anther unit. The predetermined event may include functions of interrupt occurrence, for example, the booting of the electronic device 100, App execution, the attachment of an auxiliary device such as USB, on-the-go (OTG), and an earphone, a call, a message, and a notification. For example, the current control unit 120 may obtains the maximum value of a current flowing through each unit during the time that video is being played and may then transmit the obtained maximum value of the current to the AP 140 or may transmit it to an output device such as a display module to notify the current maximum value to a user.

Then, the current control unit 120 may transmit a current value or a processed value to the AP 140 or another unit or may notify it to a user.

The battery 130 supplies power to the electronic device 100 through the power management module 110. According to the use of the battery 130, the capacity of the battery 130 is reduced. When a battery voltage drops to cutoff voltage, sudden power off may occur during the use of the electronic device 100.

The AP 140 may control a plurality of hardware or software components connected to the AP 140 and also may perform processing and operations on various data with multimedia data by executing an operating system or an application program. The AP 140 may further include a graphic processing unit (GPU) and an RF module in addition to the main control module 141.

The storage unit 150, as a typical storage medium, may store data such as a reference current value, a database, and a look-up table necessary for comparing a current value in the current control unit 120. The storage unit 150 may store data necessary for calculating a temperature prediction value by using a current value and the remaining battery power. The storage unit 150 may compare the received current value with a reference current value or may store an instruction set or a program routine necessary for calculating a current value. Alternatively, the storage unit 150 may store data or programs necessary for controlling a current flowing through each unit through the AP 140 or the power management module 110. The storage unit 150 according to this embodiment may be implemented using Hard Disk Drive (HDD), Read Only Memory (ROM), Random Access Memory (RAM), Flash Memory, Memory Card, NAND memory, and Solid State Drive (SDD).

The temperature detection unit 160 may detect a temperature of each unit. For example, the temperature detection unit 160 may be implemented using a temperature sensor attached to a corresponding unit. The current control unit 120 may check a temperature change according to a current control of a unit through the temperature detection unit 160. Alternatively, the current control unit 120 may obtain a temperature prediction value representing the future temperature change by using a temperature detected through the temperature detection unit 160.

The fuel gauge 170 may detect a battery capacity. The fuel gauge 170 may notify a battery capacity according to the use or charging of an electronic device to the AP 140 or the current control unit 120.

Figure 2:
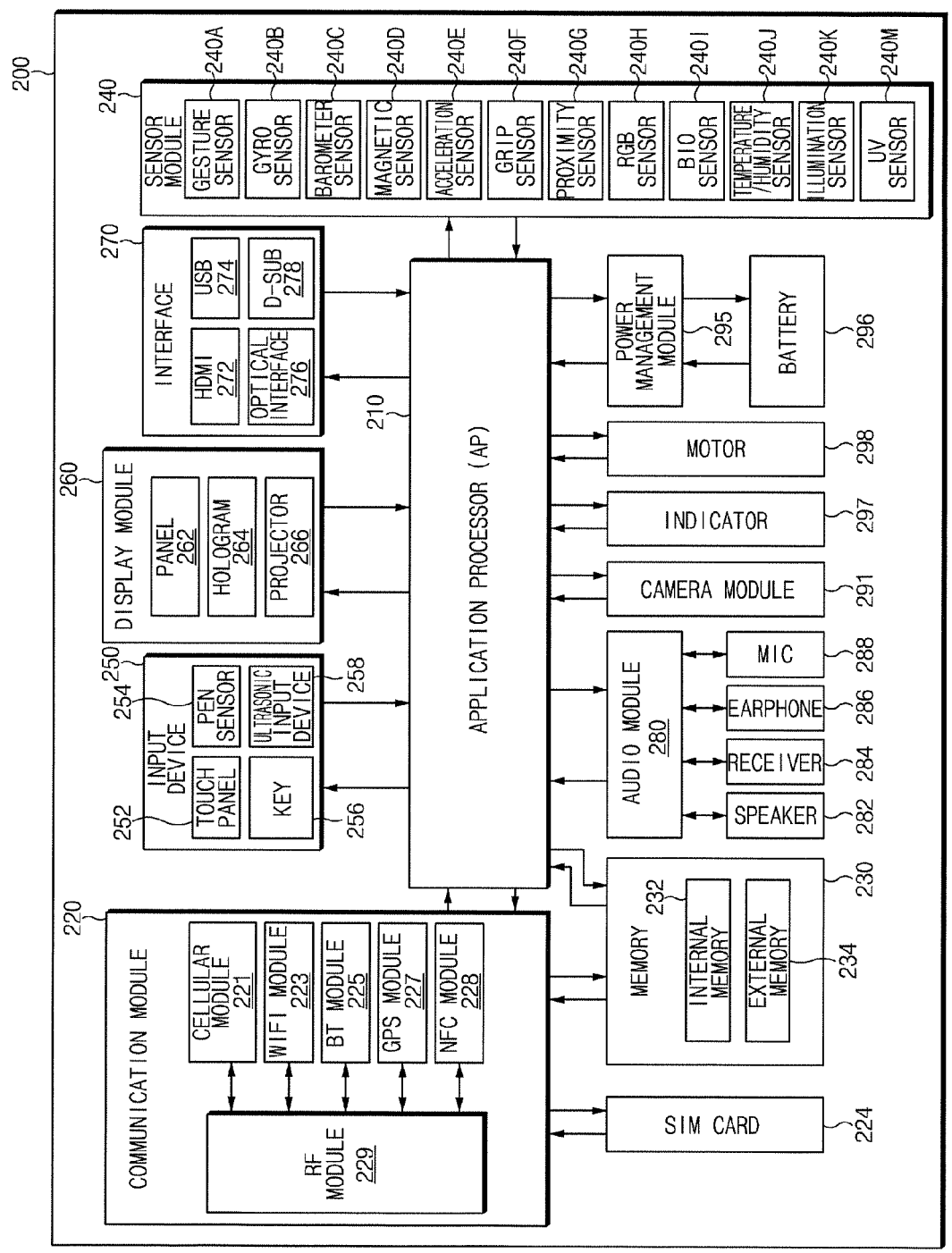
FIG. 2 illustrates an electronic device according to various embodiments of the present disclosure.

FIG. 2 is a block diagram of an electronic device according to various embodiments of the present disclosure.

Referring to FIG. 2, the electronic device 200 includes at least one application processor (AP) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The AP 210 may control a plurality of hardware or software components connected to the AP 210 and also may perform processing and operations on various data with multimedia data by executing an operating system or an application program. The AP 210 may be implemented with a system on chip (SoC), for example. According to an embodiment, the processor 210 may further include a graphic processing unit (GPU) (not shown).

The AP 210 includes a current control unit that controls a current flowing through each unit of the electronic device 200. The current control unit of this embodiment corresponds to the current control unit 120 shown in FIG. 1. Among the contents omitted below, the contents relating to the current control unit 120 shown in FIG. 1 may be applied to the current control unit of FIG. 2.

The current control unit may control a current flowing through each unit on the basis of a current value received from the power management module 295. The current control unit may adjust a clock of a unit that is to control current according to a received current value. Alternatively, the current control unit may adjust an operation of a regulator supplying voltage to a unit that is to control current through the current management module 295. The current control unit may compare a current value received from the power management module 295 with a current value stored in the memory 230, a DB, or a look-up table. Alternatively, the current control unit may perform calculation on a current value received from the power management module 295.

The communication module 220 may perform data transmission and reception in a communication with other electronic devices connected to the electronic device 200 through a network. According to an embodiment, the communication module 220 may include a cellular module 221, a WiFi module 223, a BT module 225, a GPS module 227, an NFC module 228, and a RF module 229.

The cellular module 221 may provide voice calls, video calls, text services, or internet services through a communication network (for example, LTE, LTE-A, CDMA, WCDMA, UMTS, WiBro, or GSM). The cellular module 221 may identify and authenticate an electronic device in a communication network by using a subscriber identification module (for example, the SIM card 224), for example. According to an embodiment, the cellular module 221 may perform at least part of a function that the AP 210 provides. For example, the cellular module 221 may perform at least part of a multimedia control function.

According to an embodiment, the cellular module 221 may include a communication processor (CP). Additionally, the cellular module 221 may be implemented with a SoC, for example. As shown in FIG. 2, components such as the cellular module 221 (for example, a CP), the memory 230, or the power management module 295 are separated from the AP 210, but according to an embodiment, the AP 210 may be implemented including some of the above-mentioned components (for example, the cellular module 221).

According to an embodiment, the AP 210 or the cellular module 221 (for example, a CP) may load instructions or data, which are received from a nonvolatile memory or at least one of other components connected thereto, into a volatile memory and then may process them. Furthermore, the AP 210 or the cellular module 221 may store data received from or generated by at least one of other components in a nonvolatile memory.

Each of the WiFi module 223, the BT module 225, the GPS module 227, and the NFC module 228 may include a processor for processing data transmitted/received through a corresponding module. Although the cellular module 221, the WiFi module 223, the BT module 225, the GPS module 227, and the NFC module 228 are shown as separate blocks in FIG. 2, according to an embodiment, some (for example, at least two) of the cellular module 221, the WiFi module 223, the BT module 225, the GPS module 227, and the NFC module 228 may be included in one integrated chip (IC) or an IC package. For example, at least some (for example, a CP corresponding to the cellular module 221 and a WiFi processor corresponding to the WiFi module 223) among processors respectively corresponding to the cellular module 225, the WiFi module 227, the BT module 228, the GPS module 221, and the NFC module 223 may be implemented with one SoC.

The RF module 229 may be responsible for data transmission/reception, for example, the transmission/reception of an RF signal. Although not shown in the drawings, the RF module 229 may include a transceiver, a power amp module (PAM), a frequency filter, or a low noise amplifier (LNA). Additionally, the RF module 229 may further include components for transmitting and receiving electromagnetic waves in a free space as a wireless communication, for example, conductors or conducting wires. Although the cellular module 221, the WiFi module 223, the BT module 225, the GPS module 227, and the NFC module 228 share one RF module 229 shown in FIG. 2, according to an embodiment, at least one of the cellular module 221, the WiFi module 223, the BT module 225, the GPS module 227, and the NFC module 228 may perform the transmission of an RF signal through an additional RF module.

The SIM card 224 may be a card including a subscriber identification module and may be inserted into a slot formed at a specific location of an electronic device. The SIM card 224 may include unique identification information (for example, an integrated circuit card identifier (ICCID)) or subscriber information (for example, an international mobile subscriber identity (IMSI)).

The memory 230 may store data such as a reference current value, a database, and a look-up table necessary for comparing a current value in the current control unit. The memory 230 may store data necessary for calculating a temperature prediction value by using a current value and the remaining battery power. The memory 230 may store an instruction set or a program routine necessary for comparing the received current value with a reference current value or calculating a current value. Alternatively, the memory 150 may store data or programs necessary for controlling a current flowing through each unit through the AP 210 or the power management module 295.

The memory 230 may include an internal memory 232 or an external memory 234. The internal memory 232 may include at least one of a volatile memory (for example, dynamic RAM (DRAM), static RAM (SRAM), synchronous dynamic RAM (SDRAM)) and a non-volatile memory (for example, one time programmable ROM (OTPROM), programmable ROM (PROM), erasable and programmable ROM (EPROM), electrically erasable and programmable ROM (EEPROM), mask ROM, flash ROM, NAND flash memory, and NOR flash memory).

According to an embodiment, the internal memory 232 may be a Solid State Drive (SSD). The external memory 234 may further include flash drive, for example, compact flash (CF), secure digital (SD), Micro-SD, Mini-SD, extreme digital (xD), or a memorystick. The external memory 234 may be functionally connected to the electronic device 200 through various interfaces. According to an embodiment, the electronic device 200 may further include a storage device (or a storage medium) such as a hard drive.

The sensor module 240 measures physical quantities or detects an operating state of the electronic device 200, thereby converting the measured or detected information into electrical signals. The sensor module 240 may include at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (for example, a red, green, blue (RGB) sensor), a bio sensor 240I, a temperature/humidity sensor 240J, an illumination sensor 240K, and an ultra violet (UV) sensor 240M. The temperature/humidity sensor 240J may detect a temperature of each unit. The current control unit may check a temperature change according to a current control of a unit through the temperature/humidity sensor 240J. Alternatively, the current control unit may obtain a temperature prediction value representing the future temperature change by using a temperature detected through the temperature/humidity sensor 240J.

Additionally/alternatively, the sensor module 240 may include an E-nose sensor (not shown), an electromyography (EMG) sensor, an electroencephalogram (EEG) sensor (not shown), an electrocardiogram (ECG) sensor (not shown), an infra red (IR) sensor (not shown), an iris sensor (not shown), or a fingerprint sensor (not shown). The sensor module 240K may further include a control circuit for controlling at least one sensor therein.

The input module 250 may include a touch panel 252, a (digital) pen sensor 254, a key 256, or an ultrasonic input device 258. The touch panel 252 may recognize a touch input through at least one of capacitive, resistive, infrared, or ultrasonic methods, for example. Additionally, the touch panel 252 may further include a control circuit. In the case of the capacitive method, direct touch, or proximity recognition are possible. The touch panel 252 may further include a tactile layer. In this case, the touch panel 252 may provide a tactile response to a user.

The (digital) pen sensor 254 may be implemented through a method similar or identical to that of receiving a user's touch input or an additional sheet for recognition. The key 256 may include a physical button, a touch key, an optical key, or a keypad, for example. The ultrasonic input device 258, as a device checking data by detecting sound waves through a mic (for example, a mic 288) in the electronic device 200, may provide wireless recognition through an input tool generating ultrasonic signals. According to an embodiment, the electronic device 200 may receive a user input from an external device (for example, a computer or a server) connected to the electronic device 1801 through the communication module 220.

When it is determined that at least one is abnormal in the current control unit, the display module 260 may display that the unit is abnormal and may then notify it to a user. Alternatively, when an available time of the electronic device 200 is less than a predetermined time, information that sudden power off can occur is displayed on the display module 260 and notified to a user.

The display module 260 may include a display driving module 262, a panel 264, a hologram device 266, or a projector 268. According to an embodiment, the display driving module 262 may further include a control circuit for controlling the panel 264, the hologram device 266, or the projector 268. The panel 264 may include a liquid-crystal display (LCD) or an active-matrix organic light-emitting diode (AM-OLED). The panel 264 may be implemented to be flexible, transparent, or wearable, for example. The panel 264 and the touch panel 252 may be configured with one module. The hologram 266 may show three-dimensional images in the air by using the interference of light. The projector 268 may display an image by projecting light on a screen. The screen, for example, may be placed inside or outside the electronic device 200.

The interface 270 may include a high-definition multimedia interface (HDMI) 272, a universal serial bus (USB) 274, an optical interface 276, or a D-subminiature (sub) 278, for example. Additionally/alternately, the interface 270 may include a mobile high-definition link (MHL) interface, a secure Digital (SD) card/multi-media card (MMC) interface, or an infrared data association (IrDA) standard interface.

The audio module 280 may convert sound into electrical signals and convert electrical signals into sounds. The audio module 280 may process sound information inputted to or outputted through a speaker 282, a receiver 284, an earphone 286, or a microphone 288.

The camera module 291, as a device for capturing a still image and a video, may include at least one image sensor (for example, a front sensor or a rear sensor), a lens (not shown), an image signal processor (ISP) (not shown), or a flash (not shown) (for example, an LED or a xenon lamp).

The power management module 295 may manage the power of the electronic device 200. The power management module 295 may include at least one regulator for supplying a unit-specific voltage to each unit of an electronic device and a current sensing unit for detecting a current outputted from each regulator. Additionally, the current sensing unit may detect an input current value at an input stage of the power management module 295 connected to a battery.

A regulator outputs a voltage corresponding to an operating voltage of a unit connected to the regulator by converting an inputted voltage. According to various embodiments, the regulator may include a buck converter, an LDO, a boost converter, a DC-DC regulator, and a switching regulator.

A current value obtained by a current sensing unit may be delivered to the current control unit 120 by using a serial interface such as I2C. The delivery of a current value to the current control unit 120 is not limited to a serial interface and includes all devices and methods for delivering a current value to the current control unit 120. Although not shown in the drawings, the power management module 295 may include a power management IC (PMIC), a charger IC, or a battery or fuel gauge, for example.

A battery supplies power to the electronic device 200 through the power management module 295. A fuel gauge may detect the capacity of a battery. The fuel gauge may notify the remaining battery power according to the use of the electronic device 200 to the AP 210.

The PMIC may be built in an IC or SoC semiconductor, for example. A charging method may be classified into a wired method and a wireless method. The charger IC may charge a battery and may prevent overvoltage or overcurrent flow from a charger. According to an embodiment, the charger IC may include a charger IC for at least one of a wired charging method and a wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added.

The battery gauge may measure the remaining amount of the battery 296, or a voltage, current, or temperature of the battery 296 during charging. The battery 296 may store or generate electricity and may supply power to the electronic device 200 by using the stored or generated electricity. The battery 296, for example, may include a rechargeable battery or a solar battery.

The indicator 297 may display a specific state of the electronic device 200 or part thereof (for example, the AP 210), for example, a booting state, a message state, or a charging state. The indicator 297 may include an LED. The motor 298 may convert electrical signals into mechanical vibration. Although not shown in the drawings, the electronic device 200 may include a processing device (for example, a GPU) for mobile TV support. A processing device for mobile TV support may process media data according to the standards such as digital multimedia broadcasting (DMB), digital video broadcasting (DVB), or media flow.

Each of the above-mentioned components of the electronic device according to various embodiments of the present disclosure may be configured with at least one component and the name of a corresponding component may vary according to the kind of an electronic device. An electronic device according to various embodiments of the present disclosure may include at least one of the above-mentioned components, may not include some of the above-mentioned components, or may further include another component. Additionally, some of components in an electronic device according to various embodiments of the present disclosure are configured as one entity, so that functions of previous corresponding components are performed identically.

Figure 3:
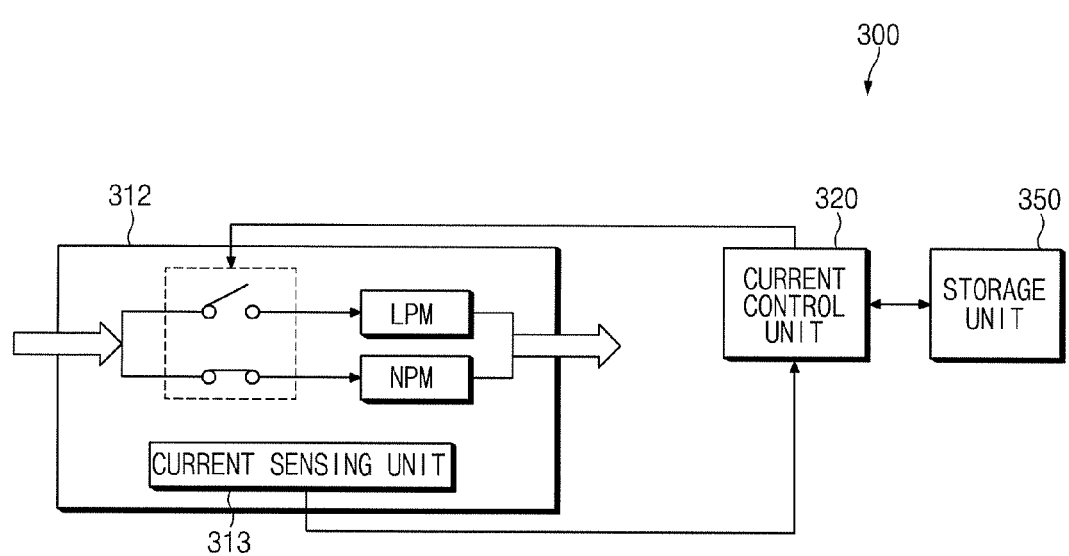
FIG. 3 illustrates an electronic device according to various embodiments of the present disclosure.

FIG. 3 illustrates an electronic device according to various embodiments of the present disclosure.

FIG. 3 corresponds to an embodiment of the electronic device 100 shown in FIG. 1. Although one regulator 312 is shown in FIG. 3, the present disclosure is not limited thereto and a number of regulators necessary for supplying voltage to units of the electronic device 300 may be included. Referring to FIG. 3, the electronic device 300 may include at least one regulator 312 of a power management module, a current sensing unit 313, a current control unit 320, and a storage unit 350.

In order to not to obscure the features of this embodiment in this specification, only components relating to this embodiment will be described. Accordingly, it is apparent to those skilled in the art that other general components instead of the components shown in FIG. 3 are further included.

The regulator 312 switches between two power modes of an LPM and an NPM. Although it is described in this embodiment that the power mode of the regulator 312 has two modes, that is, the LPM and NPM, the present disclosure is not limited thereto and the electronic device 300 may have various power modes.

For convenience of description, it is described that the regulator 312 has two modes, that is, the LPM and the NPM. The regulator 312 may change a power mode from the NPM into the LPM in response to a signal from the current control unit 320.

For example, when a current value becomes less than a reference current value, a power mode of the regulator 312 switches into the LPM. As a power mode switches according to a current value, the power consumption of the electronic device 300 may be reduced.

Figure 4:
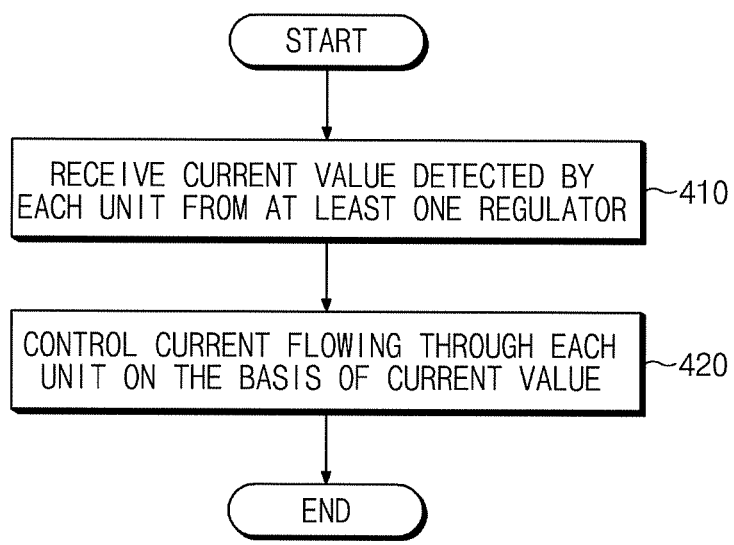
FIG. 4 illustrates a method of controlling current in an electronic device according to various embodiments of the present disclosure.

FIG. 4 illustrates a method of controlling current in an electronic device according to various embodiments of the present disclosure.

The method described with reference to FIG. 4 is configured with operations processed in time series in the electronic devices 100 and 200 shown in FIGS. 1 and 2. Accordingly, among the contents omitted in this embodiment, the contents described above in relation to the electronic devices 100 and 200 shown in FIGS. 1 and 2 may be applied to the method described with reference to FIG. 4.

In operation 410, the current control unit 120 receives a current value detected by at least one regulator 112 of the electronic device 100. The at least one regulator 112 may supply a unit-specific voltage to each unit.

In operation 420, the current control unit 120 controls a current flowing through the each unit on the basis of the current value. The current control unit 120 may adjust a clock of a corresponding unit or may control an operation of at least one regulator. For example, the current control unit 120 may adjust a clock of a corresponding unit gradually according to a current value difference.

Accordingly, the electronic device 100 may prevent a temperature rise in advance and may drive the electronic device 100 efficiently.

Figure 5:
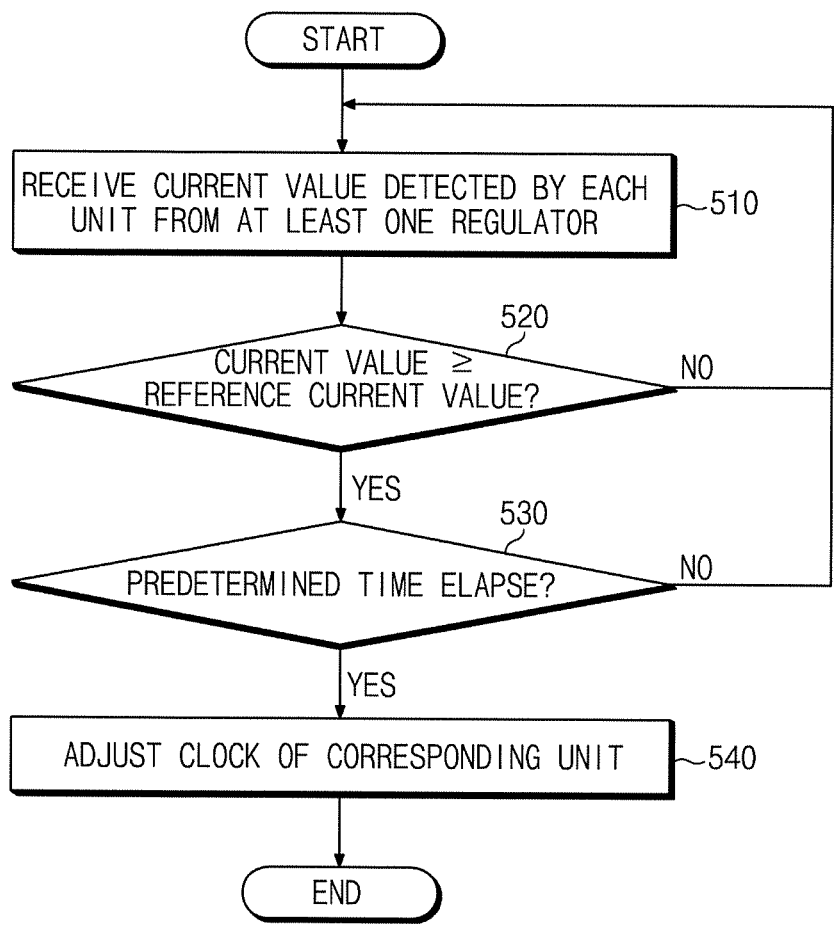
FIG. 5 illustrates a method of controlling current in an electronic device according to various embodiments of the present disclosure.

FIG. 5 illustrates a method of controlling current in an electronic device according to various embodiments of the present disclosure.

The method described with FIG. 5 is configured with operations processed in time series in the electronic devices 100 and 200 shown in FIGS. 1 and 2. Accordingly, the contents described above in relation to the electronic devices 100 and 200 shown in FIGS. 1 and 2 are applied to the method described with reference to FIG. 5. Accordingly, the contents even omitted in this embodiment may be applied to the method described with reference to FIG. 5.

In operation 510, the current control unit 120 receives a current value detected by at least one regulator 112 of the electronic device 100.

In operation 520, the current control unit 120 compares the current value with a reference current value of a corresponding unit. A unit-specific reference current value may be stored in a DB format in the storage unit 150.

When the current value is greater than a reference current value, the current control unit 120 performs operation 530. When the current value is not greater than the reference current value, the current control unit 120 performs operation 510.

A comparison operation described in this embodiment is not limited to a comparison of a received current value and a reference current value and according to various embodiments, the current control unit 120 may compare a processed value with data such as a reference value stored in the storage unit 150, a DB, and a look-up table, on the basis of the received current value.

In operation 530, the current control unit 120 determines whether a current value exceeding a reference current value is maintained for a predetermined time. When the current value exceeding the reference current value is maintained for the predetermined time, the current control unit 120 performs operation 540. When the current value exceeding the reference current value is not maintained for the predetermined time, the current control unit 120 performs operation 510.

In operation 540, the current control unit 120 adjusts a clock of a corresponding unit. Alternatively, the current control unit 120 may adjust an operation of the power control module 110.

Figure 6:
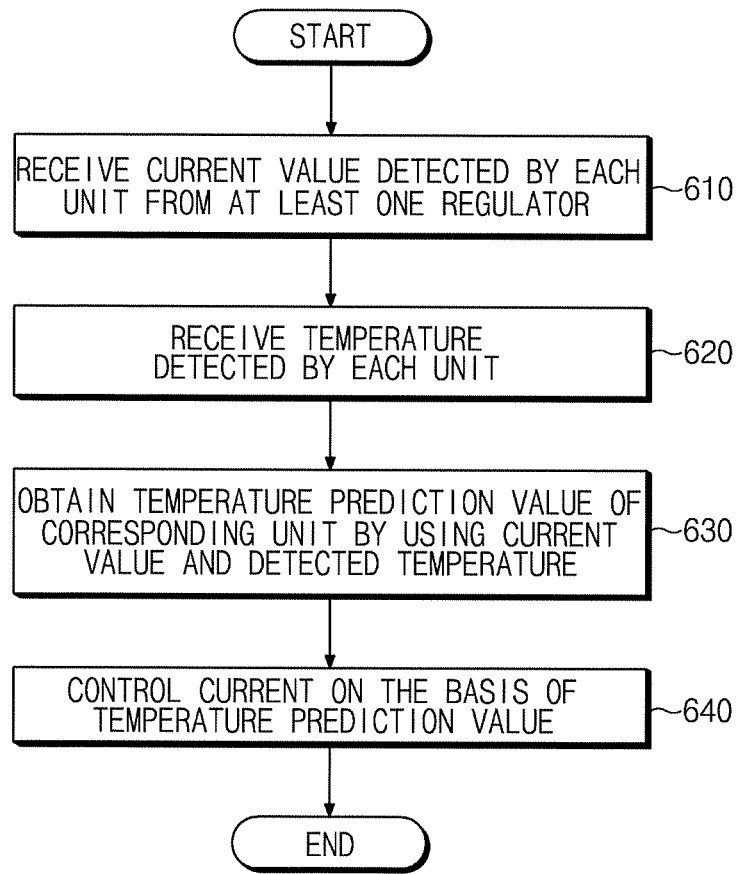
FIG. 6 illustrates a method of controlling current in an electronic device according to various embodiments of the present disclosure.

FIG. 6 illustrates a method of controlling current in an electronic device according to various embodiments of the present disclosure.

The method described with reference to FIG. 6 is configured with operations processed in time series in the electronic devices 100 and 200 shown in FIGS. 1 and 2. Accordingly, among the contents omitted in this embodiment, the contents described above in relation to the electronic devices 100 and 200 shown in FIGS. 1 and 2 may be applied to the method described with reference to FIG. 6.

In operation 610, the current control unit 120 receives a current value detected by at least one regulator 112 of the electronic device 100.

In operation 620, the current control unit 120 receives a temperature detected by the each unit.

In operation 630, the current control unit 120 may obtain a temperature prediction value representing a temperature change of the unit by using the current value and the detected temperature of a corresponding unit. The current control unit 120 may calculate a temperature prediction value by using a temperature prediction algorithm such as a Kalman filter.

In operation 640, the current control unit 120 controls the current on the basis of the temperature prediction value. The current control unit 120 may adjust a clock of the unit when the temperature prediction value exceeds a reference temperature value. Alternatively, the current control unit 120 may control a voltage of the at last one regulator when the temperature prediction value exceeds a reference temperature value.

Accordingly, the electronic device 100 may control a current flowing through each unit by using an accurate temperature prediction value calculated based on a real time current value and a real time temperature value, through the AP 140 or the power control module 110.

Figure 7:
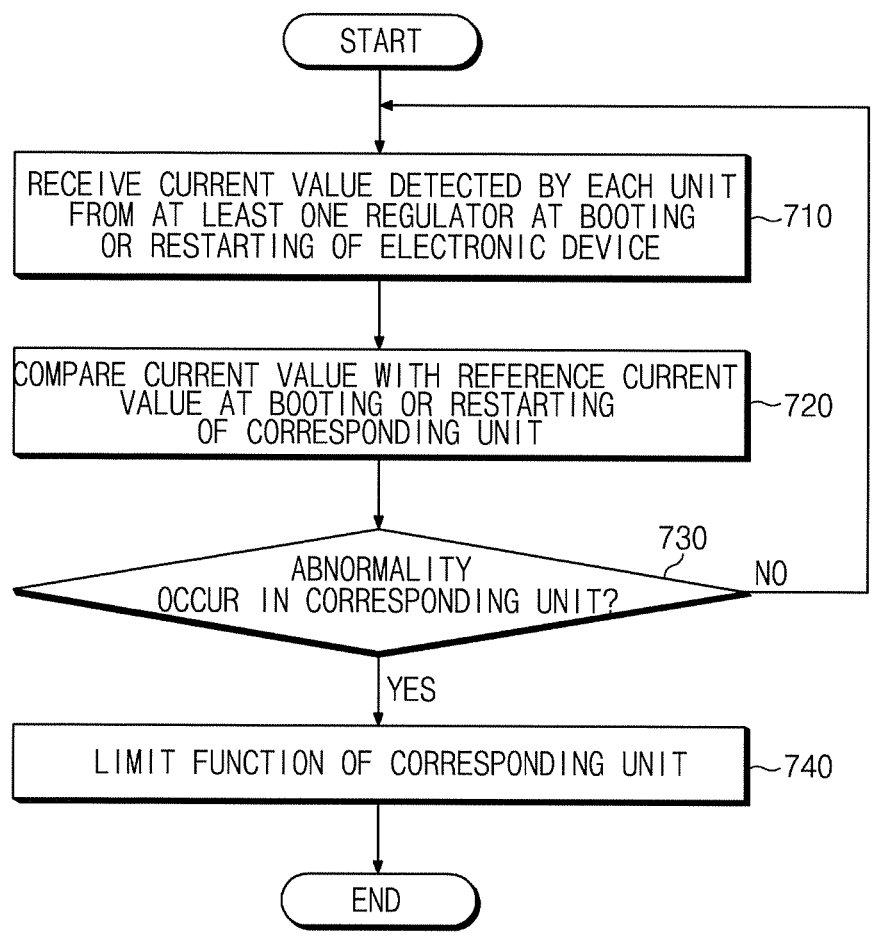
FIG. 7 illustrates a method of controlling current in an electronic device according to various embodiments of the present disclosure.

FIG. 7 illustrates a method of controlling current in an electronic device according to various embodiments of the present disclosure.

The method described with reference to FIG. 7 is configured with operations processed in time series in the electronic devices 100 and 200 shown in FIGS. 1 and 2. Accordingly, among the contents omitted in this embodiment, the contents described above in relation to the electronic devices 100 and 200 shown in FIGS. 1 and 2 may be applied to the method described with reference to FIG. 7.

In operation 710, the current control unit 120 receives a current value detected by at least one regulator 112 during the booting or restarting of the electronic device 100.

In operation 720, the current control unit 120 compares the current value with a reference current value during the booting or restarting of a corresponding unit. For example, a reference current value at the booting or restarting for each unit may be stored in a DB format.

In operation 730, the current control unit 120 may determine whether the unit is normal on the basis of the comparison result. For example, the current control unit 120 may determine that the unit is abnormal when a current exceeding a reference current value flows through a corresponding unit.

When it is determined that the corresponding unit is abnormal, the current control unit 120 performs operation 740. When it is determined that the corresponding unit is normal, the current control unit 120 performs operation 710.

In operation 740, the current control unit 120 limits a function of the corresponding unit. In this embodiment, it is described that a function of the corresponding unit is limited when it is determined that the corresponding unit is abnormal but the present disclosure is not limited thereto. According to various embodiments, when it is determined that the unit is abnormal, the current control unit 120 may restart the electronic device 100 or may notify that the unit is abnormal. Alternatively, the current control unit 120 may restart the electronic device 100 after notifying that the unit is abnormal, limit a function of the corresponding unit after notifying that the unit is abnormal, or limit a function of the corresponding unit after restarting the electronic device 100.

Accordingly, the electronic device 100 detects an abnormal unit in advance to prevent the damage of the power control module 110 or a corresponding unit.

Figure 8:
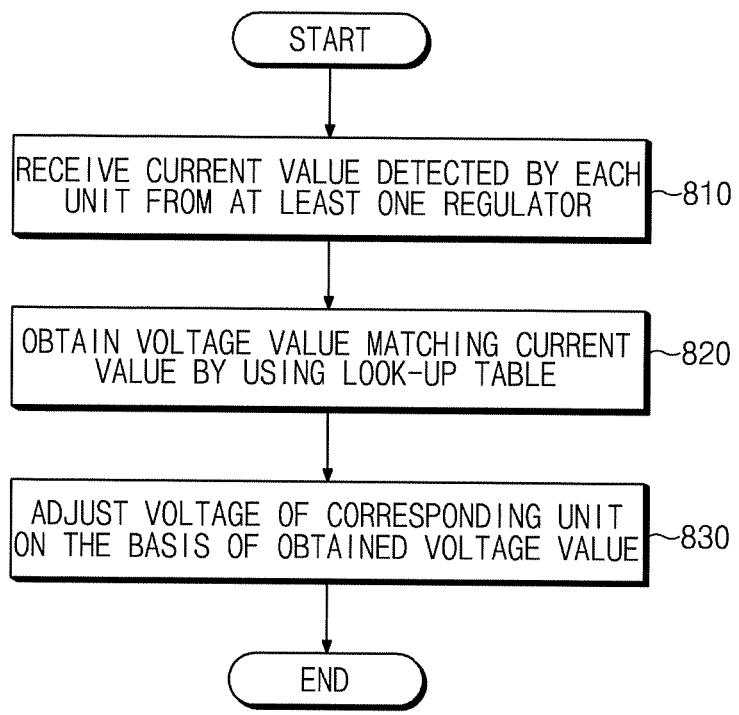
FIG. 8 illustrates a method of controlling current in an electronic device according to various embodiments of the present disclosure.

FIG. 8 illustrates a method of controlling current in an electronic device according to various embodiments of the present disclosure.

The method described with reference to FIG. 8 is configured with operations processed in time series in the electronic devices 100 and 200 shown in FIGS. 1 and 2. Accordingly, among the contents omitted in this embodiment, the contents described above in relation to the electronic devices 100 and 200 shown in FIGS. 1 and 2 may be applied to the method described with reference to FIG. 8.

In operation 810, the current control unit 120 receives a current value detected by at least one regulator 112 of the electronic device 100.

In operation 820, the current control unit 120 may obtain a voltage value matching the current value by using a look-up table of a corresponding unit. The look-up table stores voltage values corresponding to a current value for each unit.

In operation 830, the current control unit 120 adjusts a voltage of the unit on the basis of the obtained voltage value. As the received current value is lower, a voltage of the unit may be adjusted to be lower.

Accordingly, the electronic device 100 may adjust a voltage of a corresponding unit by using a look-up table, with respect to units (for example, units not performing dynamic voltage and frequency scaling (DVFS) or dynamic clock and voltage scaling (DCVS)) of which voltages are not changed by the AP 140.

Figure 9:
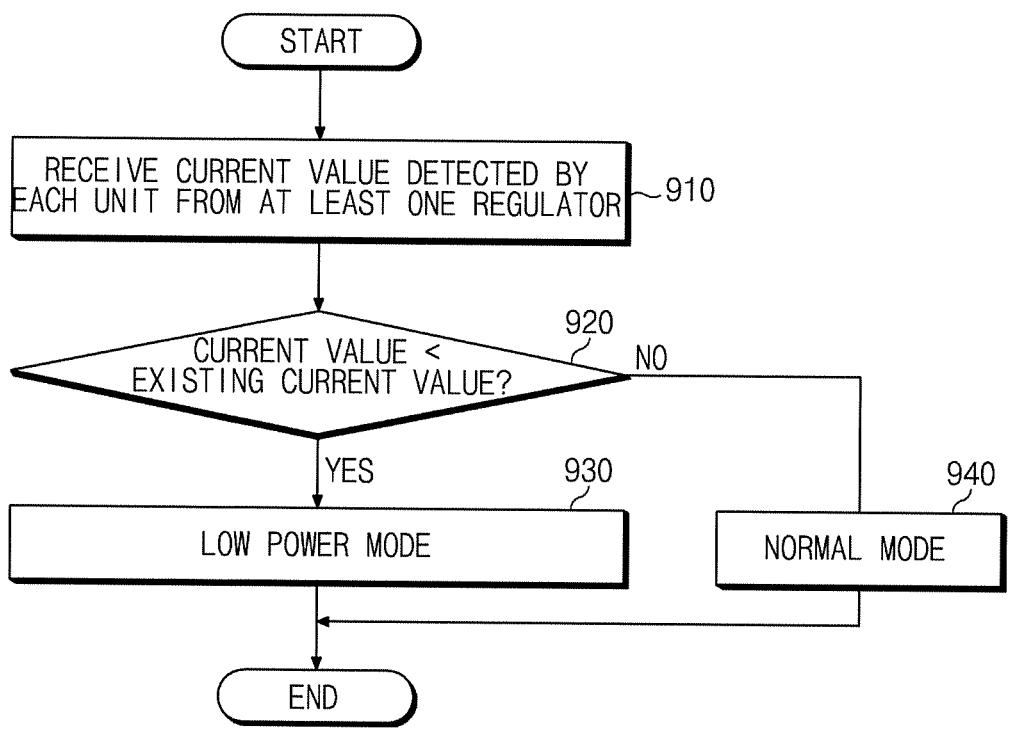
FIG. 9 illustrates a method of controlling current in an electronic device according to various embodiments of the present disclosure.

FIG. 9 illustrates a method of controlling current in an electronic device according to various embodiments of the present disclosure.

The method described with reference to FIG. 9 is configured with operations processed in time series in the electronic devices 100 and 200 shown in FIGS. 1 and 2. Accordingly, among the contents omitted in this embodiment, the contents described above in relation to the electronic devices 100 and 200 shown in FIGS. 1 and 2 may be applied to the method described with reference to FIG. 9.

In operation 910, the current control unit 120 receives a current value detected by at least one regulator 112 of the electronic device 100.

In operation 920, the current control unit 120 determines whether the received current value is less than a reference current value. The current control unit 120 may change a power mode of a regulator of a corresponding unit to allow power consumption to be changed according to a current value.

In operation 930, the current control unit 120 changes a regulator of a corresponding unit into an LPM. The regulator may switch into one of an LPM and an NPM.

The current control unit 120 may change a power mode of a regulator of a corresponding unit into an LPM to reduce power consumption.

In operation 940, the current control unit 120 changes a regulator of a corresponding unit into an NPM.

Accordingly, a regulator of the power control module 110 may change a power mode on the basis of an actual current value. Accordingly, power consumption may be reduced.

Figure 10:
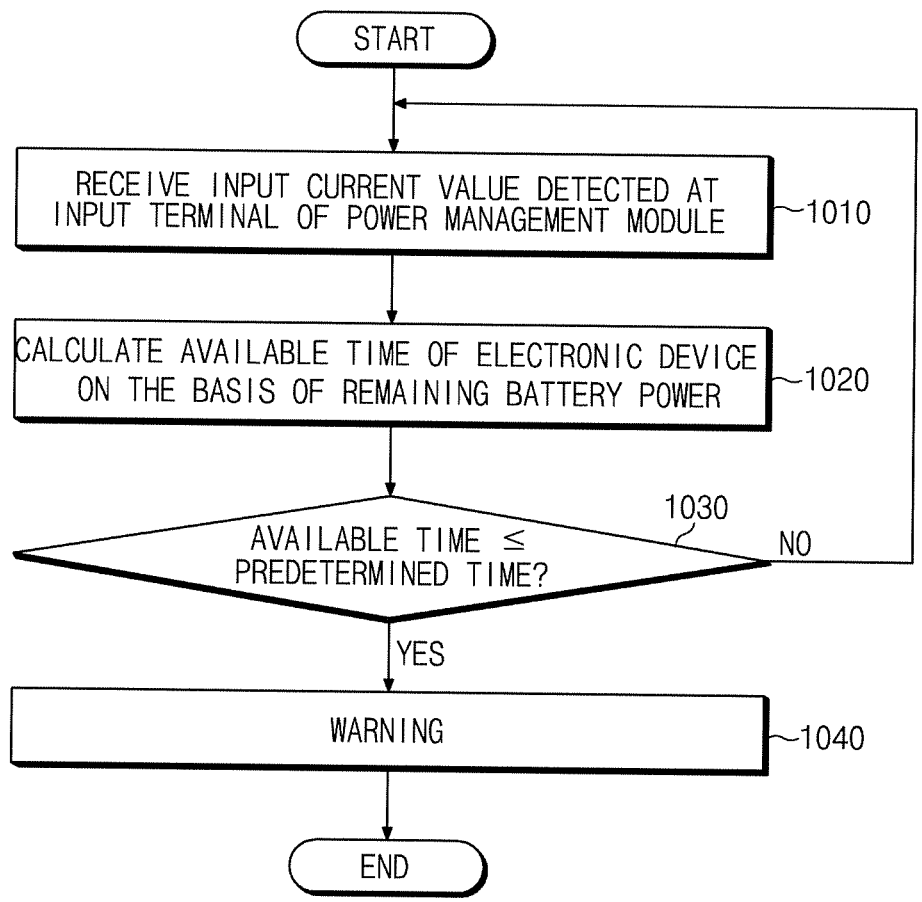
FIG. 10 illustrates a method of controlling current in an electronic device according to various embodiments of the present disclosure.

FIG. 10 illustrates a method of controlling current in an electronic device according to various embodiments of the present disclosure.

The method described with reference to FIG. 10 is configured with operations processed in time series in the electronic devices 100 and 200 shown in FIGS. 1 and 2. Accordingly, among the contents omitted in this embodiment, the contents described above in relation to the electronic devices 100 and 200 shown in FIGS. 1 and 2 may be applied to the method described with reference to FIG. 10.

In operation 1010, the current control unit 120 receives an input current value detected at an input stage of the power management module 110, which is connected to the battery 130 of the electronic device 100.

In operation 1020, the current control unit 120 calculates an expected available time of the electronic device 100 on the basis of the remaining battery power when the input current value is maintained.

In operation 1030, the current control unit 120 compares the available time with a predetermined time. For example, the current control unit 120 may determine the possibility for sudden power off on the basis of the available time.

In operation 1040, when the available time is less than a predetermined time, the current control unit 120 sends a warning.

By controlling a current flowing through each unit of an electron device, it is possible to reduce a temperature heating. Additionally, by preventing a temperature rise for each unit, it is possible to prevent the damage of devices and ICs of an electronic device. Accordingly, it is possible to reduce the power consumption of an electronic device and also may manage an electronic device efficiently.

The term "module" used in this disclosure, for example, may mean a unit including a combination of at least one of hardware, software, and firmware. The term "module" and the term "unit", "logic", "logical block", "component", or "circuit" may be interchangeably used. A "module" may be a minimum unit or part of an integrally configured component. A "module" may be a minimum unit performing at least one function or part thereof. A "module" may be implemented mechanically or electronically. For example, "module" used in this disclosure may include at least one of an application-specific integrated circuit (ASIC) chip performing certain operations, field-programmable gate arrays (FPGAs), or a programmable-logic device, all of which are known or to be developed in the future.

According to various embodiments, at least part of a device (for example, modules or functions thereof) or a method (for example, operations) according to this disclosure, for example, as in a form of a programming module, may be implemented using an instruction stored in computer-readable storage media. When at least one processor (for example, the AP 210) executes an instruction, it may perform a function corresponding to the instruction. The non-transitory computer-readable storage media may include the memory 230, for example. At least part of a programming module may be implemented (for example, executed) by AP 210, for example. At least part of a programming module may include a module, a program, a routine, sets of instructions, or a process to perform at least one function, for example.

The computer-readable storage media may include Magnetic Media such as a hard disk, a floppy disk, and a magnetic tape, Optical Media such as Compact Disc Read Only Memory (CD-ROM) and Digital Versatile Disc (DVD), Magneto-Optical Media such as Floptical Disk, and a hardware device especially configured to store and perform a program instruction (for example, a programming module) such as Read Only Memory (ROM), Random Access Memory (RAM), and flash memory. Additionally, a program instruction may include high-level language code executable by a computer using an interpreter in addition to machine code created by a complier. The hardware device may be configured to operate as at least one software module to perform an operation of this disclosure and vice versa.

A module or a programming module according to the present disclosure may include at least one of the above-mentioned components, may not include some of the above-mentioned components, or may further include another component. Operations performed by a programming module or other components according to the present disclosure may be executed through a sequential, parallel, repetitive or heuristic method. Additionally, some operations may be executed in a different order or may be omitted. Or, other operations may be added.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of controlling current, the method comprising:
   receiving a current value detected by at least one regulator supplying a unit-specific voltage to each unit of an electronic device; and
   controlling a current flowing through the each unit on a basis of the current value,
   wherein the controlling of the current comprises changing a power mode of the at least one regulator of a corresponding unit to change power consumption according to the current value, and
   wherein the at least one regulator switches into one of a low power mode and a normal power mode and when the current value becomes less than a reference current value, the power mode of the at least one regulator switches into the low power mode.

2. The method according to claim 1, further comprising performing data processing of the current value,
   wherein the controlling of the current comprises controlling the current flowing through the each unit on a basis of a value processed through the data processing.

3. The method according to claim 2, wherein the performing of the data processing comprises performing the data processing on a current value obtained during a predetermined time or a predetermined event occurrence.

4. The method according to claim 2, further comprising delivering the processed value to another unit of the electronic device or notifying the processed value to a user.

5. The method according to claim 1, wherein the controlling of the current comprises:
   comparing the current value with a reference current value of a corresponding unit; and
   adjusting a clock of the unit when the current value exceeding the reference current value continues for more than a specific time.

6. The method according to claim 1, further comprising:
   receiving a temperature detected by the each unit; and
   obtaining a temperature prediction value representing a temperature change of a unit by using the current value and the detected temperature of a corresponding unit,
   wherein the controlling of the current comprises controlling the current based on a basis of the temperature prediction value.

7. The method according to claim 6, wherein the controlling of the current comprises adjusting a clock of the unit when the temperature prediction value exceeds a reference temperature value.

8. The method according to claim 6, wherein the controlling of the current comprises controlling an operation of the at least one regulator when the temperature prediction value exceeds a reference temperature value.

9. The method according to claim 1, wherein the controlling of the current comprises:
   comparing the current value obtained at booting or restarting of the electronic device with a reference current value at booting or restarting of a corresponding unit;
   determining whether the unit is normal on a basis of the comparison result; and
   controlling the current according to whether the unit is normal.

10. The method according to claim 9, wherein the controlling of the current comprises, when it is determined that the unit is abnormal, performing at least one of limiting a function of the unit, restarting the electronic device, and notifying that the unit is abnormal.

11. The method according to claim 1, wherein the controlling of the current comprises:
obtaining a voltage value matching the current value by using a look-up table of a corresponding unit; and
adjusting a voltage of the unit on a basis of the obtained voltage value.

12. The method according to claim 11, further comprises lowering a voltage of the unit as the current value is lower.

13. The method according to claim 1,
wherein receiving the current value is receiving an input current value detected at an input stage of a power management module managing a unit-specific voltage, which is connected to a battery of an electronic device; and
wherein the method further comprises calculating an expected available time of the electronic device on a basis of a remaining power of the battery when the input current value is maintained and when the expected available time is less than a specific time, sending a warning.

14. An electronic device comprising:
a current sensing unit configured to detect a current outputted from at least one regulator included in a power management module supplying a unit-specific voltage to each unit of an electronic device; and
a current control unit configured to control a current flowing through the each unit on a basis of a current value received from the current sensing unit,
wherein the at least one regulator is configured to switch into one of a lower power mode and a normal power mode and the power management module is configured to change a power mode of the at least one regulator supplying voltage to a corresponding unit according to the current value.

15. The electronic device according to claim 14, wherein the current control unit is configured to perform data processing of the current value and control a current flowing through the each unit on a basis of a value processed through the data processing.

16. The electronic device according to claim 15, wherein the current control unit is configured to perform the data processing on a current value obtained during a specific time or a specific event occurrence.

17. The electronic device according to claim 15, further comprising a display module configured to display the processed value,
wherein the current control unit delivers the processed value to another unit of the electronic device or the display module.

18. The electronic device according to claim 14, further comprising a storage unit configured to store a unit-specific reference current value,
wherein the current control unit compares the current value with a reference current value of a corresponding unit and adjusts a clock of the unit when a current value exceeding the reference current value continues for more than a specific time.

19. The electronic device according to claim 14, further comprising a temperature detection unit configured to detect a temperature at the each unit,
wherein the current control unit is configured to obtain a temperature prediction value representing a temperature change of a unit by using the current value and the detected temperature of a corresponding unit and control the current on a basis of the predicted temperature value.

20. The electronic device according to claim 19, wherein when the temperature prediction value exceeds a reference temperature value, the current control unit adjusts a clock of the unit or the power management module controls an operation of the at least one regulator.

21. The electronic device according to claim 14, further comprising a storage unit configured to store a unit-specific reference current value obtained at booting or restarting of the electronic device,
wherein the current control unit is configured to compare the current value with a reference current value of a corresponding unit, determine whether the unit is normal on a basis of the comparison result, and control the current on a basis of whether the unit is normal.

22. The electronic device according to claim 21, wherein when it is determined that the unit is abnormal, the current control unit is configured to perform at least one of: limiting a function of the unit, restarting the electronic device, and notifying that the unit is abnormal.

23. The electronic device according to claim 14, further comprising a storage unit configured to store a unit-specific look-up table,
wherein the current control unit is configured to obtain a voltage value matching the current value by using the unit-specific look-up table; and
the power management module is configured to adjust a voltage of the unit on a basis of the obtained voltage value.

24. The electronic device according to claim 14, wherein the current sensing unit is configured to detect an input current at an input stage of the power management module, which is connected to a battery; and
the current control unit is configured to calculate an expected available time of the electronic device when an input current value received from the current sensing unit is maintained on a basis of a remaining power of the battery and send a warning when the expected available time is less than a specific time.

* * * * *